G. A. SPINNER.
LATHE.
APPLICATION FILED JUNE 5, 1911.

1,002,327.

Patented Sept. 5, 1911.

2 SHEETS—SHEET 1.

Witnesses
W. Thornton Bogert
B. P. Kropf

Inventor
George A. Spinner
By C. W. Miles.
Attorney

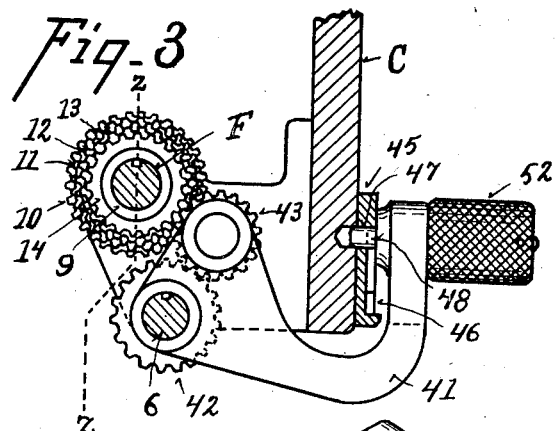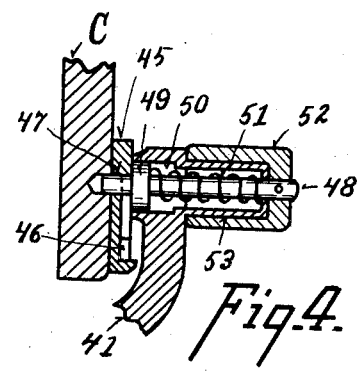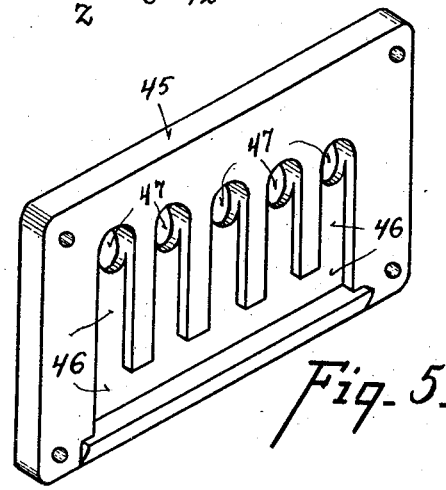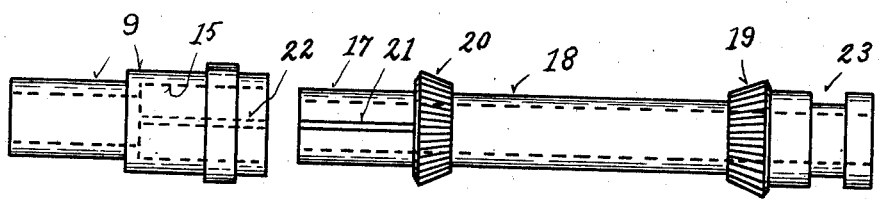

UNITED STATES PATENT OFFICE.

GEORGE A. SPINNER, OF CINCINNATI, OHIO.

LATHE.

1,002,327.      Specification of Letters Patent.      Patented Sept. 5, 1911.

Application filed June 5, 1911. Serial No. 631,261.

*To all whom it may concern:*

Be it known that I, GEORGE A. SPINNER, a citizen of the United States, residing at Cincinnati, in the county of Hamilton and State of Ohio, have invented certain new and useful Improvements in Lathes, of which the following is a specification.

My invention relates to improvements in lathes. One of its objects is to provide improved driving mechanism both longitudinal and cross feed for the tool carriage members.

Another object is to provide improved and simple mechanism operable at the tool carriage to effect speed changes in the feed of the tool carriage members.

Another object is to provide an improved arrangement and combination of parts carried by the tool carriage to effect speed changes in the feed of the tool carriage members.

Figure 1:
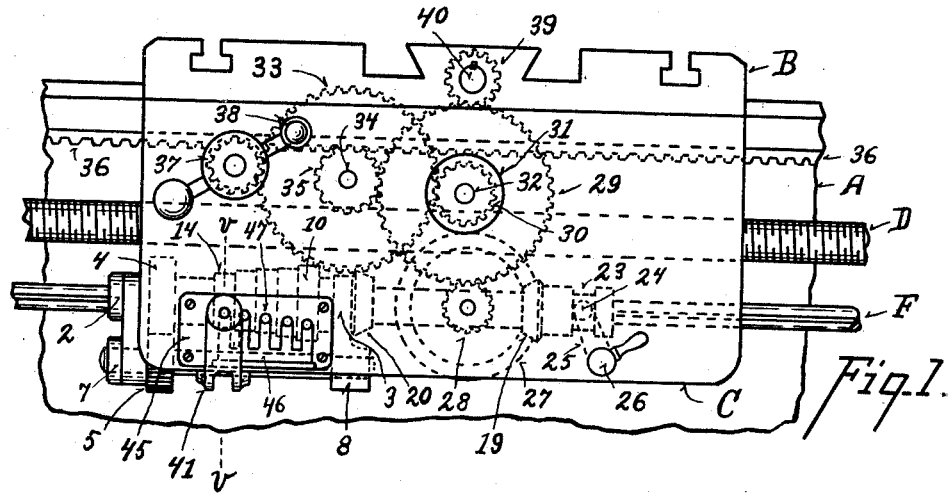
Figure 2:
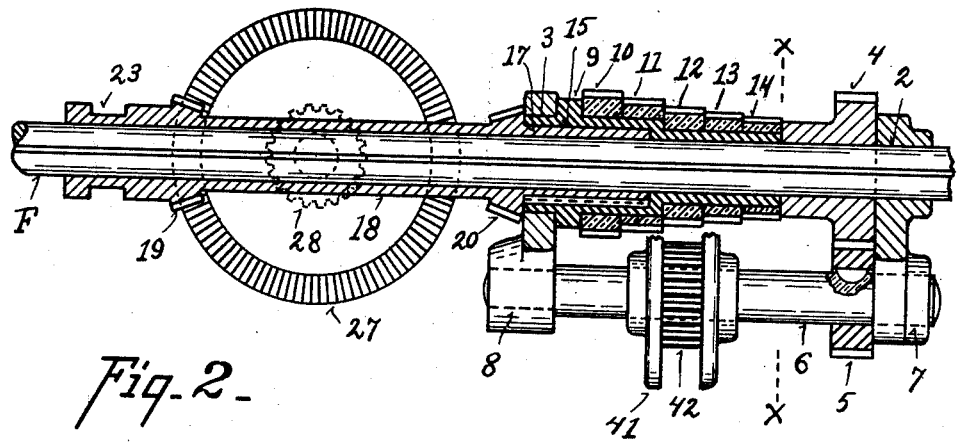

My invention further consists in certain details of form, combination and arrangement, all of which will be more fully set forth in the description of the accompanying drawings, in which:

Figure 1 is a front elevation of a lathe tool carriage and apron embodying my invention. Fig. 2 is an enlarged detail partly in section on line *z z* of Fig. 3. Fig. 3 is an enlarged sectional detail on line *x x* of Fig. 2. Fig. 4 is an enlarged sectional detail on line *v v* of Fig. 1. Fig. 5 is a perspective view of the change speed guiding and locking plate. Fig. 6 is a side elevation of the change gear sleeve and beveled gear sleeve carried by the feed rod, detached.

In the accompanying drawings illustrating the preferred embodiment of my invention, A represents the lathe bed, B the tool carriage mounted and adjustable longitudinally thereon, and C the lathe apron.

D represents the usual lead screw and F the feed rod, which may be driven either by gears or by belt at the lathe head stock. The feed rod F is supported in bearings 2, 3 attached to the apron C, and has splined thereto intermediate of said bearings a gear 4 which meshes with and drives a gear 5 rigidly secured to a shaft 6 which is journaled in bearings 7 and 8 carried by the apron C. A sleeve 9 is loosely journaled upon the feed rod with one end supported in the bearing 3 and the opposite end abutting against the hub of gear 4, whereby the sleeve 9 is limited as to movement endwise. A plurality of gears 10, 11, 12, 13, 14, of different diameter are rigidly secured upon the exterior of said sleeve, and said sleeve is provided with an internal recess 15 to receive the end 17 of a sleeve 18 which is loosely journaled upon the feed rod F and provided exteriorly with two beveled gears 19, 20. The end 17 of the sleeve 18 is provided with a key 21 which engages a key way 22 in the recess 15 of the sleeve 9 to cause the sleeves 9 and 18 to rotate together. The sleeve 18 has an annular groove 23 which is engaged by pins 24 of a forked crank arm 25 carried by a shifting rod 26 journaled to the apron C, and by means of which the sleeve 18 may be shifted endwise to engage either one of the gears 19, 20 with the beveled gear 27 to reverse the direction of rotation of the gear 27. In an intermediate position the gears 19, 20 are both out of engagement with gear 27.

The gear 27 is journaled to the apron and carries with it a pinion 28 which in turn drives a gear 29 carried rigidly on a shaft 32 on which is loosely journaled a pinion 30. A knurl 31 serves to clutch the gear 29 to the pinion 30, and to release said clutch. A gear 33 on the shaft 34 meshes with and is driven by the pinion 30, and the gear 33 in turn drives a pinion 35 which engages the rack 36 on the lathe bed A, to feed the carriage longitudinally. A pinion 37 is in mesh with the gear 33 and by means of the crank 38 is adapted to feed the carriage longitudinally by hand when the clutch controlled by knurl 31 is disengaged. The gear 29 is also adapted to engage and drive a pinion 39 on the cross feed screw 40 to feed the tool holder, not shown, crosswise of the lathe bed. The pinion 39 is slidable longitudinally of the cross feed screw to shift said pinion into and out of engagement with the gear 29.

A forked sector arm or lever 41 is journaled upon the shaft 6 and carries between its arms a gear 42 splined to the shaft 6 and adapted to be fed longitudinally on said shaft with said sector arm, and a gear 43 in mesh with and adapted to travel concentrically about the gear 42 with the movements of said sector arm. By shifting the sector arm along shaft 6 the gear 43 is adapted to mesh with and drive any one of the change gears 10 to 14, and thereby to drive the sleeves 9 and 18 at several different rates of speed.

The free end of the sector arm extends around the lower edge of the apron so as to occupy a position at the front of the apron and opposite a guiding and locking plate 45 secured to the front of the apron. A spring actuated pin 48 carried by the free end of the sector arm is adapted to engage any one of a series of perforations 47 in the plate 45 to lock the gear 43 in engagement with the respective gears 10 to 14. When the pin 48 is not in engagement with one of said perforations is it in engagement with a recess 46 from which it can not be detached, which recess serves to hold the sector arm in place and to guide the pin 48 through the desired channels in adjusting the pin from one of the perforations 47 to another. The pin 48 has an annular enlargement 49 having a limited movement endwise of the pin 48 in a recess 50 in the free end of the sector arm. A spring 51 serves to press the pin 48 against the plate 45, and a knurled head 52 pivotally supported upon the projection 53 of the sector arm and keyed to the pin 48 enables the pin 48 to be retracted within the limits of movement of the enlargement 49 to effect different adjustments of the sector arm.

The mechanism herein illustrated and described is capable of considerable modification without departing from the principle of my invention.

Having described my invention, what I claim is:

1. In a mechanism of the character described, a feed rod, a tool carriage, a supplemental shaft carried by said tool carriage and receiving motion from said feed rod, a change gear sleeve loosely journaled on said feed rod and movable with the tool carriage longitudinally of said feed rod, a plurality of change gears of different diameter rigidly mounted upon said sleeve, a sector arm journaled upon and movable longitudinally of said supplemental shaft, gear mechanism carried by said sector arm adapted to transmit motion from said supplemental shaft to said change gears, a reversing sleeve loosely journaled upon said feed rod splined to said change gear sleeve and adjustable endwise relative to said tool carriage, said reversing sleeve being provided with a plurality of beveled gears, and a beveled gear journaled in fixed relation to the tool carriage and adapted to receive motion in opposite directions through engagement with the respective beveled gears on said reversing sleeve, and through a train of gears to feed said tool carriage.

2. In a mechanism of the character described, a feed rod, a tool carriage, a supplemental shaft journaled in fixed relation to the tool carriage, means to transmit motion from said feed rod to said supplemental shaft, a plurality of change gears of different diameter journaled in common in fixed relation to said tool carriage, a train of gears operatively connected to said change gears and adapted to be driven thereby and to feed said tool carriage, a sector arm pivotally mounted upon said supplemental shaft and adjustable longitudinally thereof, a plurality of gears carried by said sector arm adapted to transmit motion from said supplemental shaft selectively to said respective change gears, and a guide and locking plate carried by said tool carriage having locking recesses and guide channels, and a member carried by the free end of said sector arm adapted to continuously engage said guide and locking plate and by traveling through said guide channels from one locking recess to another to carry said sector arm and its gears from engagement with one change gear into engagement with another change gear.

3. In a mechanism of the character described, a feed rod, a tool carriage, a supplemental shaft journaled in fixed relation to the tool carriage, gear mechanism carried by said tool carriage to transmit motion from said feed rod to said supplemental shaft, a change gear sleeve loosely journaled upon said feed rod in fixed relation to said tool carriage, a plurality of change gears rigidly mounted upon said change gear sleeve, a train of gears operatively connected to said change gear sleeve and adapted to be driven thereby and to feed said tool carriage, a sector arm pivotally mounted upon said supplemental shaft and adjustable longitudinally thereof, a plurality of gears carried by said sector arm adapted to transmit motion from said supplemental shaft selectively to said respective change gears, a guide and locking plate carried on the outer face of said tool carriage and provided with locking recesses to lock said sector arm in position for its gears to transmit motion to said respective change gears, and guide channels leading from one to another of said locking recesses, and a member carried by the free end of said sector arm adapted to continuously engage said guide and locking plate and by traveling through said guide channels from one locking recess to another to carry said sector arm and its gears from engagement with one change gear into engagement with another change gear.

4. In a mechanism of the character described, a feed rod, a tool carriage, a supplemental shaft carried by said tool carriage gear mechanism carried by said tool carriage to transmit motion from said feed rod to said supplemental shaft, a change gear sleeve loosely journaled on said feed rod in fixed relation to said tool carriage, a plurality of change gears of different diameter rigidly mounted upon said sleeve, a forked sector arm journaled upon and movable longitudinally of said supplemental shaft, a gear splined to said supplemental shaft and carried between the arms of said sector arm, a gear carried by said sector arm in mesh with and adjustable concentrically about said gear splined to said supplemental shaft and adjustable to engage and drive any one of said change gears, a reversing sleeve loosely journaled upon said feed rod, having sliding engagement with said change gear sleeve, and adjustable endwise relative to said tool carriage, said reversing sleeve being provided with a plurality of gears, and a train of gears carried by said tool carriage adapted to be driven in reverse direction by the respective gears on said reversing sleeve to feed said tool carriage.

5. In a mechanism of the character described, a feed rod, a tool carriage having bearings to support said feed rod, a gear splined to the feed rod and movable with said carriage, a supplemental shaft journaled to said tool carriage and provided with a gear receiving motion from said gear on the feed rod, a change gear sleeve loosely journaled on said feed rod and movable endwise thereon with said tool carriage, a plurality of change gears of different diameter carried by said sleeve, a sector arm pivotally mounted upon said secondary shaft and adjustable longitudinally thereof, a plurality of gears carried by said sector arm adjustable to transmit motion from said secondary shaft selectively to any one of said change gears, a beveled gear carried by the tool carriage and serving through a train of gears to feed the tool carriage, and a reversing sleeve loosely journaled on said feed rod and provided with beveled gears adapted to alternately engage opposite sides of said beveled gear on the tool carriage, said reversing sleeve being operatively connected to said change gear sleeve and adjustable endwise relative to said tool carriage.

In testimony whereof I have affixed my signature in presence of two witnesses.

GEORGE A. SPINNER.

Witnesses:
C. W. MILES,
W. THORNTON BOGERT.

---

Copies of this patent may be obtained for five cents each, by addressing the "Commissioner of Patents, Washington, D. C."